United States Patent [19]

Delacretaz et al.

[11] Patent Number: 5,058,564
[45] Date of Patent: Oct. 22, 1991

[54] SOLAR COLLECTOR

[76] Inventors: John Delacretaz, 15 Mortimer Street, Heidelberg, Victoria 3084, Australia; Terence L. Johnson, 9 Rydon Street, Islington, London N1 7AL, United Kingdom

[21] Appl. No.: 469,412
[22] PCT Filed: Oct. 4, 1988
[86] PCT No.: PCT/GB88/00811
§ 371 Date: Mar. 23, 1990
§ 102(e) Date: Mar. 23, 1990
[87] PCT Pub. No.: WO89/03007
PCT Pub. Date: Apr. 6, 1989

[30] Foreign Application Priority Data

Oct. 5, 1987 [GB] United Kingdom ............... 8723318

[51] Int. Cl.⁵ .................................... F24J 2/10
[52] U.S. Cl. ............................ 126/438; 126/451
[58] Field of Search ............................ 126/438, 451

[56] References Cited

U.S. PATENT DOCUMENTS 4,132,219  1/1979  Cohen et al. ..................... 126/438
4,175,540 11/1979  Roantree et al. .
4,212,290  7/1980  Warnken .
4,235,224 11/1980  Yarwood et al. .
4,236,383 12/1980  Selcuk .
4,236,506 12/1980  Roark .
4,324,947  4/1982  Dumbeck .
4,637,376  1/1987  Varney et al. .

FOREIGN PATENT DOCUMENTS 3045662  7/1982  Fed. Rep. of Germany .
2469675  5/1981  France .
8100755  3/1981  PCT Int'l Appl. .

Primary Examiner—Carroll B. Dority
Attorney, Agent, or Firm—Flynn, Thiel, Boutell & Tanis

[57] ABSTRACT

A solar collector includes a collector body having a substantially curved collector surface. A reflective device projects from the collector body and reflects incident solar energy to the collector surface. The collector body is substantially conical and the reflective device is secured to and projects externally from the conical collector body. The reflective device has a curved surface which extends along an arc of a circle and which overlies the collector surface for reflecting incident solar radiation over a portion of the collector surface.

7 Claims, 1 Drawing Sheet

SOLAR COLLECTOR

The invention relates to solar collectors.

Such collectors of incident solar energy usually comprise bodies of hollow heat conductive materials such as copper or brass, and containing a heat transfer medium such as water. The collectors catch the sun's rays to cause transfer of heat to the water, which can then be circulated for heating purposes. Such collectors often have a curved collector surface configuration, particularly substantially conical. These collectors then cast a "shadow" from one side to the other when in the sun's rays, so providing unequal heating and lowering their efficiency because not all the available surface area is available for collecting incident solar energy.

According to the invention there is provided a solar collector, comprising collector means having a substantially curved collector surface configuration and a reflective device projecting from the collector means and adapted to reflect incident solar energy to the collector surface, characterised by the collector means being substantially conical and by the reflective device being secured to and projecting externally from a major radius of the collector means and having a curved major surface which extends over an arc of a circle and overlies the collector device the arrangement being such that a projection of the reflective device onto the collector means provides for collection of incident solar energy over substantially the whole of the collecting surface of the collector device.

The curved reflective device may be a part cylindrical member.

The member may extend over an arc of substantially 180°.

The collector means may be substantially conical for example an inverted cone.

Solar collectors embodying the invention are hereinafter described, by way of example, with reference to the accompanying drawings.

Figure 1:
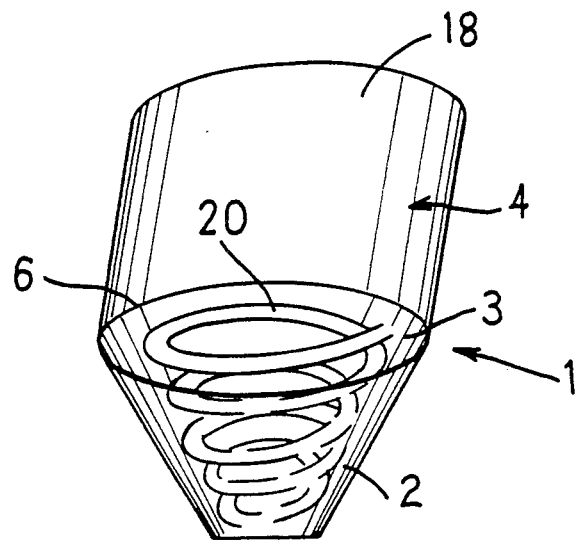
FIG. 1 is a schematic perspective view of one embodiment of a solar collector according to the invention.
Figure 2:
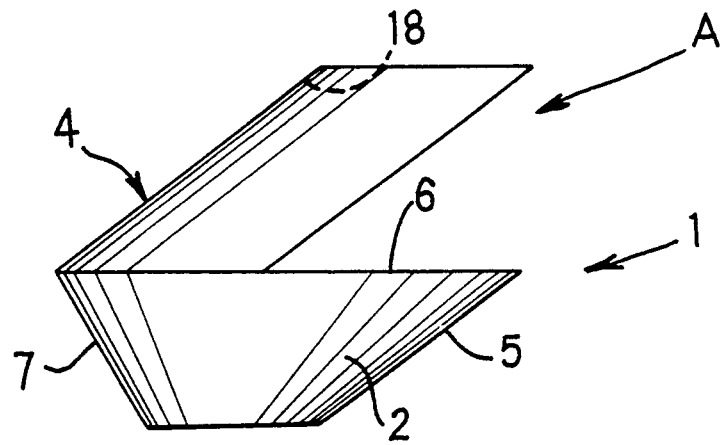
FIG. 2 is a side view of the collector of FIG. 1.

Referring to the drawings, FIGS. 1 and 2 show a solar collector 1, comprising collector means 2 having a substantially curved collector surface configuration 3 and a reflective device 4 projecting from the collector means 2 and adapted to reflect incident solar energy to the collector surface 3. The collector means 2 in FIGS. 1 and 2 is a frusto-conical cup-like means which has on its inner surface a spiral pipe 20 through which heat transfer medium such as water passes. The water is heated by the incident solar energy collected by the collector means and is circulated for use elsewhere. Because it is essentially conical, the side 5 of the collector surface nearest the sun's rays, arrow A in FIG. 2, is in shadow. The reflective device 4, which is a metal sheet or mirror glass is curved through an arc of 180° (or 110 radius) and projects upwardly from a fixed end at the rim 6 of the collector means 2 over half the circumference and is inclined to the vertical and terminates in a free end so that it partly overlies the collector means 2. Solar energy incident on the reflective device 4 is reflected into the collector means 2 to strike hitherto "shaded" part 5 so that the whole of the interior is utilised in collecting solar energy (which is incident directly on the part 7 of the collector means beneath the reflective device 4).

The reflective device 4 has a curved major surface 18 which faces and overlies the collector surface 3.

Figure 3:
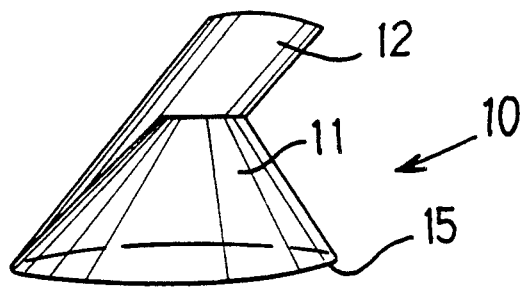
FIG. 3 is a schematic perspective view of a second embodiment of a solar collector according to the invention.

The embodiment 10 shown in FIG. 3 is similar to that shown in FIGS. 1 and 2 in that there is a frustoconical collector means 11 and a reflective device 12. In this embodiment 10 the frusto-cone is inverted. The reflective device 12 projects upwardly from the base 15 of the collector means 11, and overlies it.

It will be understood that the reflective device 4,12 and collector means 2,11 are secured together as by any suitable means such as brazing or welding.

It will also be understood that the collector means 2,11 may be conical instead of frusto-conical as shown.

In every embodiment the reflective device 4,12 substantially increases the effectiveness of the collectors in that it doubles their collecting efficiency. This leads to a reduction in weight because smaller and hence lighter collectors can be utilised. This is important where the collectors are to be installed on the roof of a building as it means that expensive strengthening of the roof can be avoided.

We claim:

1. A solar collector, comprising an upwardly opening cup-like and substantially conical collector means having a substantially curved collector surface, and a reflective device projecting from the collector means and adapted to reflect incident solar energy onto the collector surface, said curved collector surface being an interior surface of said cup-like collector means, said cup-like collector means having an upper rim which defines an upper opening for permitting solar energy to enter the interior of said collector means, the reflective device being secured to and projecting upwardly and exteriorly from the collector means, said reflective device having a fixed end which is fixed to said collector means, said reflective device projecting inwardly from said rim and having an upper free end disposed above and inwardly of said fixed end, said reflective device having an inwardly concavely curved major surface which connects said fixed and free ends and has a curvature corresponding to an arc of a circle, said major surface facing generally toward said collector surface and vertically overlying a portion thereof for reflecting incident solar energy onto a shaded portion of the collector surface to permit collection of incident solar energy over substantially the entire collector surface.

2. A solar collector according to claim 1, wherein the curved reflective device is a member which defines part of a circular cylinder, said circular cylinder being centered on a first line which is parallel to a second line which perpendicularly intersects said fixed and free ends of said reflective device.

3. A solar collector, comprising an upwardly opening cup-like and substantially conical collector means having a substantially curved collector surface, and a reflective device projecting from the collector means and adapted to reflect incident solar energy onto the collector surface, said curved collector surface being an interior surface of said cup-like collector means, said cup-like collector means having an upper rim which defines an upper opening for permitting solar energy to enter the interior of said collector means, the reflective device being secured to and projecting upwardly and exteriorly from the collector means, said reflective device having a fixed end which is fixed to said collector means, said reflective device projecting inwardly from said rim and having an upper free end disposed above and inwardly of said fixed end, said reflective device having an inwardly concavely curved major surface which connects said fixed and free ends and has a curvature corresponding to an arc of a circle, said major surface facing generally toward said collector surface and vertically overlying a portion thereof for reflecting incident solar energy onto a shaded portion of the collector surface to permit collection of incident solar energy over substantially the entire collector surface, said reflective device being a member which defines part of a circular cylinder, said circular cylinder being centered on a first line which is parallel to a second line which perpendicularly intersects said fixed and free ends, and the member extending through an arcuate distance of substantially 180°.

4. A solar collector, comprising an upwardly opening and substantially conical collector means having a substantially curved collector surface, and a reflective device projecting from the collector means and adapted to reflect incident solar energy onto the collector surface, said collector means having an upper rim which defines an upper opening for permitting solar energy to enter the interior of said collector means, the reflective device being secured to and projecting upwardly and exteriorly from the collector means, said reflective device having a fixed end which is fixed to said collector means, said reflective device projecting inwardly of said collector means beyond said rim and having an upper free end disposed above and inwardly of said fixed end, said reflective device having an inwardly concavely curved major surface which connects said fixed and free ends and has a curvature corresponding to an arc of a circle, said major surface facing generally toward said collector surface and vertically overlying a portion thereof for reflecting incident solar energy onto a shaded portion of the collector surface to permit collection of incident solar energy over substantially the entire collector surface, the collector means being an upwardly divergent frusto-cone.

5. A solar collector according to claim 1, wherein there is heat transfer means at the collector surface.

6. A solar collector according to claim 4, wherein the collector means is an open frusto-conical member.

7. A solar collector according to claim 6, wherein there is heat transfer means at the collector surface.

* * * * *